US009416241B2

(12) United States Patent
Ozaki et al.

(10) Patent No.: US 9,416,241 B2

(45) Date of Patent: Aug. 16, 2016

(54) COMPOSITION FOR SPORTSWEAR AND FOAM THEREOF

(75) Inventors: Taro Ozaki, Osaka (JP); Toshiyuki Funayama, Osaka (JP); Toyofumi Otaka, Osaka (JP); Koshiro Hamaguchi, Osaka (JP); Motoki Kitagawa, Osaka (JP); Tadahiro Ono, Osaka (JP)

(73) Assignee: Osaka Soda Co., Ltd., Osaka-shi (JP)

( * ) Notice: Subject to any disclaimer, the term of this patent is extended or adjusted under 35 U.S.C. 154(b) by 146 days.

(21) Appl. No.: 13/982,983

(22) PCT Filed: Feb. 6, 2012

(86) PCT No.: PCT/JP2012/052631

§ 371 (c)(1), (2), (4) Date: Oct. 10, 2013

(87) PCT Pub. No.: WO2012/108386

PCT Pub. Date: Aug. 16, 2012

(65) Prior Publication Data

US 2014/0316021 A1 Oct. 23, 2014

(30) Foreign Application Priority Data

Feb. 7, 2011 (JP) ................................ 2011-024083

(51) Int. Cl.

| | |
|---|---|
| ***C08J 9/00*** | (2006.01) |
| ***C08J 9/06*** | (2006.01) |
| ***B63C 11/04*** | (2006.01) |
| ***C08J 9/10*** | (2006.01) |
| ***C08L 71/03*** | (2006.01) |
| *A41D 13/012* | (2006.01) |

(52) U.S. Cl.

CPC ................ *C08J 9/103* (2013.01); *B63C 11/04* (2013.01); *C08J 9/105* (2013.01); *C08J 9/107* (2013.01); *C08L 71/03* (2013.01); *A41D 13/012* (2013.01); *A41D 2500/52* (2013.01); *B63B 2231/48* (2013.01); *B63B 2231/50* (2013.01); *B63C 2011/046* (2013.01); *C08J 2319/00* (2013.01)

(58) Field of Classification Search

None

See application file for complete search history.

(56) References Cited

U.S. PATENT DOCUMENTS

| | | | | |
|---|---|---|---|---|
| 2003/0078309 | A1* | 4/2003 | Koffler | 521/79 |
| 2004/0214915 | A1 | 10/2004 | Patel et al. | |
| 2004/0214916 | A1 | 10/2004 | Patel et al. | |
| 2004/0214932 | A1 | 10/2004 | Patel et al. | |
| 2004/0214939 | A1 | 10/2004 | Patel et al. | |
| 2006/0128857 | A1* | 6/2006 | Otaka et al. | 524/322 |
| 2009/0252951 | A1* | 10/2009 | Ozaki | B32B 25/08 428/319.3 |

FOREIGN PATENT DOCUMENTS

| | | | |
|---|---|---|---|
| JP | S60-172535 | A | 9/1985 |
| JP | 2005-89715 | A | 4/2005 |
| JP | 2006-524735 | A | 11/2006 |
| JP | 2006-524740 | A | 11/2006 |
| JP | 2007-262387 | A | 10/2007 |
| JP | 2010-242243 | A | 10/2010 |
| JP | 2011-013563 | A | 1/2011 |

OTHER PUBLICATIONS

Definition of "zinc oxide" from Dictionary.com. 2015.*

International Preliminary Report on Patentability (English Translation) for PCT/JP2012/052631; Date of issuance of report; Aug. 13, 2013.

Office Action for Chinese Application No. 201280006903.X dated Jan. 29, 2015.

Office Action from corresponding Chinese Patent Application No. 201280006903.X, dated Sep. 14, 2015.

International Search Report for Application No. PCT/JP2012/052631 dated May 1, 2012.

* cited by examiner

*Primary Examiner* — Kara Boyle

(74) *Attorney, Agent, or Firm* — Alston & Bird LLP

(57) ABSTRACT

A composition for sportswear, includes a rubber component (a) which contains an epihalohydrin rubber, a vulcanizing agent (b) in an amount of 0.1 to 10 parts by weight for 100 parts by weight of the rubber component (a), and a foaming agent (c) in an amount of 0.5 to 20 parts by weight therefor. The composition for sportswear is preferably includes a colorant (d).

20 Claims, No Drawings

COMPOSITION FOR SPORTSWEAR AND FOAM THEREOF

PRIORITY

This application claims priority to the PCT International Application Number PCT/JP2012/052631 filed Feb. 6, 2012, which claims priority to the Japanese Patent Application Number JP 2011-024083 filed Feb. 7, 2011.

TECHNICAL FIELD

The present invention relates to a composition for sportswear which can be colored into a vivid color, is excellent in weather resistance and cold resistance, has a good touch sense, and contains a rubber component (a) which comprises an epihalohydrin rubber, a vulcanizing agent (b), and a foaming agent (c); and a foam for sportswear which is obtained by vulcanizing and foaming the composition for sportswear.

BACKGROUND ART

Hitherto, a vulcanized foam of chloroprene rubber has been used as the material of wetsuits because of the softness and shape-keepability thereof. However, about the chloroprene vulcanized foam, the softness for functioning as a rubber is lost at low temperatures by the crystallization of chloroprene rubber, so that there remains a problem that a touch sense (feel) important for wetsuits is insufficient (see Patent Document 1).

In recent years, needs for fashioning performance have been heightening; thus, great needs for bright-color wetsuits alternative to conventional black wetsuits have been existing. A method adopted for producing a bright-color wetsuit is a method of bonding a bright fiber onto the front surface of a conventional black chloroprene vulcanized foam. However, in the case of bonding a bright-color fiber onto the front surface of a black chloroprene vulcanized foam, the black color of the black chloroprene vulcanized foam, which is an underlaid material, comes out when the wetsuit gets wet. As a result, the design performance thereof is damaged. However, in the case of using a white chloroprene vulcanized foam as an underlaid material, the wetsuit is insufficient in weather resistance. Thus, the wetsuit yellows under sunshine to cause a problem that the design performance thereof is damaged.

In the meantime, as a raw-material rubber excellent in weather resistance, known is butyl rubber (IIR), ethylene propylene diene rubber (EPDM), or chlorosulfonated polyethylene (CSM). However, the rubber cannot be used in the field of wetsuits since the rubber is poor in adhesive property onto jersey cloth.

PRIOR ART DOCUMENT

Patent Document

Patent Document 1: JP-A-2010-242243

SUMMARY OF THE INVENTION

Problems to be Solved by the Invention

An object of the present invention is to provide a composition for sportswear which can be colored into a vivid color, is excellent in weather resistance and cold resistance, and further has such a touch sense as gives, in particular, a flexibility peculiar to rubber; a foam for sportswear, obtained by vulcanizing and foaming the composition for sportswear; and a wetsuit wherein the foam for sportswear is used.

Means for Solving the Problems

The present inventors have made eager researches to find out that the present object can be attained by a composition described below for sportswear, and a foam for sportswear which includes a foam obtained by vulcanizing and foaming this composition for sportswear. On the basis of this finding, the present invention has been accomplished.

Accordingly, the present invention relates to:

1) a composition for sportswear, comprising a rubber component (a) which comprises an epihalohydrin rubber, a vulcanizing agent (b) in an amount of 0.1 to 10 parts by weight for 100 parts by weight of the rubber component (a), and a foaming agent (c) in an amount of 0.5 to 20 parts by weight therefor, and 2) a foam for sportswear, particularly a foam for a wetsuit, obtained by vulcanizing and foaming the composition for sportswear recited in item 1).

Effect of the Invention

A material of the foam according to the present invention for a wetsuit is an epihalohydrin rubber; thus, the foam can be colored into a vivid color, and is excellent in weather resistance not to be discolored even when used for a long term. Additionally, the material is further excellent in cold resistance, so that when a person puts on a wetsuit made of the foam, the wetsuit does not lose comfortableness to user even at low temperatures. Furthermore, the foam according to the present invention for a wetsuit is excellent in affinity with a chloroprene adhesive; thus, the foam is also excellent in adhesive property onto jersey cloth.

About the rubber component (a), which comprises an epihalohydrin rubber, in the composition of the present invention, the epihalohydrin rubber means any epihalohydrin homopolymer, or any copolymer made from an epihalohydrin, and another epoxide copolymerizable therewith, for example, ethylene oxide, propylene oxide or ally glycidyl ether. Examples thereof include epichlorohydrin homopolymer, epibromohydrin homopolymer, epichlorohydrin-ethylene oxide copolymer, epibromohydrin-ethylene oxide copolymer, epichlorohydrin-propylene oxide copolymer, epibromohydrin-propylene oxide copolymer, epichlorohydrin-ethylene oxide-allyl glycidyl ether terpolymer, and epibromohydrin-ethylene oxide-allyl glycidyl ether terpolymer. When the epihalohydrin rubber is used for sportswear, particularly, a wetsuit, the epihalohydrin is preferably a copolymer since the copolymer is small in hardness change at low temperatures. The epihalohydrin rubber is more preferably epichlorohydrin-ethylene oxide copolymer, or epichlorohydrin-ethylene oxide-allyl glycidyl ether terpolymer. The molecular weight of such a polymer is not particularly limited, and usually needs only to be a molecular weight which can give a viscosity satisfying the following Mooney viscosity expression: $ML_{1+4}$ (100° C.)=about 30 to 150.

In the case of epihalohydrin-ethylene oxide copolymer, the copolymerization ratio therebetween is as follows: the content by percentage of epihalohydrin is from 5 to 95% by mole, preferably from 10 to 75% by mole, more preferably from 10 to 65% by mole, and that of ethylene oxide is from 5 to 95% by mole, preferably from 25 to 90% by mole, more preferably from 35 to 90% by mole.

In the case of epihalohydrin-ethylene oxide-allyl glycidyl ether terpolymer, the copolymerization ratio therebetween is, for example, as follows: the content by percentage of epihalohydrin is from 4 to 94% by mole, preferably from 9 to 74% by mole, more preferably from 9 to 64% by mole, that of ethylene oxide is from 5 to 95% by mole, preferably from 25 to 90% by mole, more preferably from 35 to 90% by mole, and that of allyl glycidyl ether is from 1 to 10% by mole, preferably from 1 to 7% by mole.

In the rubber component (a), which comprises an epihalohydrin rubber, in the composition of the present invention, the epihalohydrin rubber is contained as a rubber component species preferably in a proportion of 10% by weight or more, more preferably 20% by weight or more, in particular preferably 40% by weight or more, most preferably 90% by weight or more.

In the rubber component (a), which comprises an epihalohydrin rubber, in the composition of the present invention, a rubber other than the epihalohydrin rubber may be natural rubber and/or a synthetic rubber. Examples of the synthetic rubber include isoprene rubber (IR), 1,2-polybutadiene (VBR), styrene butadiene rubber (SBR), butyl rubber (IIR), ethylene propylene rubber (EPM), ethylene propylene diene rubber (EPDM), chloroprene rubber (CR), chlorosulfonated polyethylene (CSM), chlorinated polyethylene (CPE), acrylic rubber (ACM), acrylonitrile butadiene rubber (NBR), and hydrogenated acrylonitrile butadiene rubber (H-NBR).

Practically preferred examples of the rubber other than the epihalohydrin rubber include natural rubber, isoprene rubber (IR), 1,2-polybutadiene (VBR), styrene butadiene rubber (SBR), butyl rubber (IIR), ethylene propylene rubber (EPM), ethylene propylene diene rubber (EPDM), chloroprene rubber (CR), chlorosulfonated polyethylene (CSM), chlorinated polyethylene (CPE), acrylic rubber (ACM), and acrylonitrile butadiene rubber (NBR). Preferred are butyl rubber (IIR), ethylene propylene rubber (EPM), ethylene propylene diene rubber (EPDM), chloroprene rubber (CR), chlorosulfonated polyethylene (CSM), chlorinated polyethylene (CPE), acrylic rubber (ACM), and acrylonitrile butadiene rubber (NBR). One or more among these rubbers are used.

When the rubber component (a), which comprises an epihalohydrin rubber, in the composition of the present invention contains the rubber other than the epihalohydrin rubber, the rubber component preferably contains 10 to 99% by weight of the epihalohydrin rubber and 1 to 90% by weight of the rubber other than the epihalohydrin rubber; more preferably contains 20 to 99% by weight of the epihalohydrin rubber and 1 to 80% by weight of the rubber other than the epihalohydrin rubber; and in particular preferably contains 40 to 95% by weight of the epihalohydrin rubber and 5 to 60% by weight of the rubber other than the epihalohydrin rubber.

The vulcanizing agent (b) used in the composition of the present invention is not particularly limited as far as the vulcanizing agent is a vulcanizing agent capable of vulcanizing the epihalohydrin rubber. The vulcanizing agent (b) is an appropriate known vulcanizing agent using the reactivity of a halogen atom (such as a chlorine atom), that is, for example, a polyamine-type vulcanizing agent, a thiourea-type vulcanizing agent, a thiadiazole-type vulcanizing agent, a polyphenol-type vulcanizing agent, a mercaptotriazine-type vulcanizing agent, a quinoxaline-type vulcanizing agent or the like; or is an appropriate known vulcanizing agent using the reactivity of a side-chain double bond, for example, an organic peroxide, sulfur, a morpholine polysulfide-type vulcanizing agent, a thiuram polysulfide-type vulcanizing agent or the like. Such vulcanizing agents may be used alone or in combination of two or more thereof.

Examples of these vulcanizing agents are described hereinafter. Examples of the polyamines include ethylenediamine, hexamethylenediamine, diethylenetriamine, triethylenetetramine, hexamethylenetetramine, p-phenylenediamine, cumenediamine, N,N'-dicinnamylidene-1,6-hexanediamine, ethylenediamine carbamate, and hexamethylenediamine carbamate.

Examples of the thioureas include ethylenethiourea, 1,3-diethylthiourea, 1,3-dibutylthiourea, and trimethylthiourea.

Examples of the thiadiazoles include 2,5-dimercapto-1,3,4-thiadiazole, and 2-mercapto-1,3,4-thiadiazole-5-thiobenzoate.

Examples of the polyphenols include bisphenol A, and bisphenol S.

Examples of the mercaptotriazines include trimercapto-5-triazine, 2-hexylamino-4,6-dimercaptotriazine, 2-diethylamino-4,6-dimercaptotriazine, 2-cyclohexylamino-4,6-dimercaptotriazine, 2-dibutylamino-4,6-dimercaptotriazine, 2-anilino-4,6-dimercaptotriazine, and 2-phenylamino-4,6-dimercaptotriazine.

Examples of the quinoxalines include 2,3-dimercaptoquinoxaline, quinoxaline-2,3-dithiocarbonate, 6-methylquinoxaline-2,3-dithiocarbonate, and 5,8-dimethylquinoxaline-2,3-dithiocarbonate.

Examples of the organic peroxides include tert-butyl hydroperoxide, p-menthane hydroperoxide, dicumyl peroxide, tert-butyl peroxide, 1,3-bis(tert-butylperoxyisopropyl) benzene, 2,5-dimethyl-2,5-di(tert-butylperoxy)hexane, benzoyl peroxide, and tert-butylperoxy benzoate.

Examples of the morpholine polysulfides include morpholine disulfide.

Examples of the thiuram polysulfides include tetramethylthiuram disulfide, tetraethylthiuram disulfide, tetrabutylthiuram disulfide, dipentamethylenethiuram tetrasulfide, and dipentamethylenethiuram hexasulfide.

Practically preferred examples of the vulcanizing agent include sulfur, bisphenol S, 6-methylquinoxaline-2,3-dithiocarbonate, trimercapto-S-triazine, ethylene thiourea, dibutyl thiourea, 1,3-diethyl thiourea, and trimethyl thiourea. Ethylene thiourea is preferred.

The blend amount of the vulcanizing agent (b) is preferably from 0.1 to 10 parts by weight, more preferably from 0.5 to 8 parts by weight, in particular preferably from 1 to 5 parts by weight for 100 parts by weight of the rubber component (a), which comprises an epihalohydrin rubber. If the blend amount of the vulcanizing agent (b) is less than 0.1 parts by weight for 100 parts by weight of the rubber component (a), which comprises an epihalohydrin rubber, the rubber component is unvulcanized. If the blend amount is more than 10 parts by weight, the resultant foam loses elasticity to turn unfavorably into a resin form.

The foaming agent (c) used in the present invention is not particularly limited, and may be any chemically foaming agent used to produce a foam. The foaming agent (c) may be an appropriate known chemically foaming agent about which a chemical reaction of the substance is used, that is, for example, an azo compound-type foaming agent, a nitroso compound-type foaming agent, a hydrazine derivative-type foaming agent, a semicarbazide compound-type foaming agent, a bicarbonate-type foaming agent or the like. These may be used alone or in combination of two or more thereof.

Examples of these foaming agents are described hereinafter. Examples of the azo compounds include azodicarbonamide, azobisisobutyronitrile, barium azodicarboxylate, and diazoaminobenzene. Examples of the nitroso compounds include dinitrosopentamethyleneteramine, N,N'-dimethyl-N,N'-dinitrosotelephthalamide, and trinitrosotrimethylenetriamine. Examples of the hydrazine derivatives include 4,4'-oxybis(benzenesulfonylhydrazide), and p-toluenesulfonylhydrazide. Examples of the semicarbazide compounds include p-toluenesulfonylsemicarbazide. Examples of the bicarbonates include sodium hydrogencarbonate.

Practically preferred examples of the foaming agent include dinitrosopentamethyleneteramine, azodicarbonamide, and 4,4'-oxybis(benzenesulfonylhydrazide). More preferred are azodicarbonamide, and 4,4'-oxybis(benzenesulfonylhydrazide).

The blend amount of the foaming agent (c) is preferably from 0.5 to 20 parts by weight, more preferably from 1 to 15 parts by weight, in particular preferably from 3 to 15 parts by weight for 100 parts by weight of the rubber component (a), which comprises an epihalohydrin rubber. If the blend amount of the foaming agent (c) is less than 0.5 parts by weight for 100 parts by weight of the epihalohydrin rubber (a), the composition is not sufficiently foamed. If the amount is more than 20 parts by weight, the composition is unfavorably hindered from being vulcanized.

Furthermore, an ordinarily used known anti-ageing agent, ultraviolet absorbent or light stabilizer may be used as it is in the composition of the present invention. Examples of the known anti-ageing agent include amine type, phenol type, benzimidazole type, dithiocarbamate type, thiourea type, especial wax type, organic thio-acid type and phosphorous type agents. Such agents may be used in combination of two or more thereof. The blend amount of one or more of these anti-ageing agents is preferably from 0.1 to 10 parts by weight, more preferably from 0.1 to 5 parts by weight, in particular preferably from 0.3 to 3 parts by weight for 100 parts by weight of the rubber component (a), which comprises an epihalohydrin rubber.

As the colorant (d), any colorant is usable without any especial limitation as far as the colorant is a colorant used ordinarily for an epihalohydrin rubber. Examples thereof include pigments and dyes. About the colorant, a single species may be used alone, or two or more species may be used in combination. In the composition of the present invention for sportswear, a bright color (non-black) blend (colorant) may be used in any case except the case of using only a black colorant, such as carbon black or graphite. The blend amount of the colorant (d) may be set in accordance with the purpose, and is not particularly limited. The blend amount is preferably from 0.01 to 100 parts by weight, more preferably from 0.01 to 80 parts by weight, in particular preferably from 0.01 to 40 parts by weight for 100 parts by weight of the rubber component (a), which comprises an epihalohydrin rubber.

Examples of the pigments include metal pigments such as aluminum powder, bronze powder and titanium yellow, carbon pigments such as carbon black and graphite, oxide pigments such as titanium oxide, zinc flower and red iron oxide, carbonate pigments such as calcium carbonate and basic magnesium carbonate, silicate pigments such as clay and ultramarine blue, aluminate pigments such as cobalt blue, ferrocyanide pigments such as iron blue, and other inorganic pigments; and azo pigments such as toluidine red, Permanent Carmine FB, Disazo Yellow AAA and Lake Red C, phthalocyanine pigments such as copper phthalocyanine (phthalocyanine blue), indanthrone pigments such as indanthrone blue, quinacridone pigments such as quinacridone red and other polycyclic pigments, dyeing lake pigments such as Victoria Pure Blue BO Lake and alkali blue toner, azine pigments, fluorescent pigments, and other organic pigments.

Examples of the dyes include a basic dye, an acid dye, an oil soluble dye, and a dispersed dye.

As the basic dye, any dye is usable without limitation as far as the dye is a dye having in the molecular structure thereof a basicity such as an amino or imino group.

As the acid dye, any dye is usable without limitation as far as the dye is a dye having in the molecular structure thereof an acid group such as a sulfone or carboxyl group.

As the oil soluble dye, any dye is usable without limitation as far as the dye is a dye soluble in many solvents, typical examples of which include mineral oils, volatile oils, and fat oils.

As the dispersed dye, any dye is usable without limitation as far as the dye is a dye which is insoluble (or slightly soluble) in water but is dispersed into the form of fine particles by effect of a dispersing agent, so as to attain dyeing.

The composition of the present invention may further contain a synthetic resin (e). Examples thereof include polymethyl methacrylate (PMMA) resin, polystyrene (PS) resin, polyurethane (PUR) resin, polyvinyl chloride (PVC) resin, ethylene-vinyl acetate (EVA) resin, styrene-acrylonitrile (AS) resin, and polyethylene (PE) resin. One or more of these resins are used.

The blend amount of the synthetic resin (e) is preferably from 1 to 900 parts by weight, more preferably from 1 to 600 parts by weight, in particular preferably from 1 to 400 parts by weight for 100 parts by weight of the rubber component (a), which comprises an epihalohydrin rubber.

As far as the advantageous effects of the present invention are not damaged, compounding ingredients other than the above-mentioned agents may be arbitrarily blended into the composition of the present invention for sportswear, examples of the ingredients including a lubricant, a filler, a reinforcing agent, a plasticizer, a processing aid, a frame retardant, a foaming aid, an electro-conductant, and an anti-static agent.

In order to produce the composition according to the present invention for sportswear, any mixing means used conventionally in the field of polymer-processing may be used, examples of the means including a mixing roll, a Banbury mixer, and various kneaders.

A foam can be obtained by vulcanizing and foaming the composition of the present invention for sportswear. A foaming method adoptable therefor is any foaming method used conventionally in the field of the production of foams. In the case of using, for example, a chemically foaming agent, the epihalohydrin rubber is vulcanized to be shaped and further a reaction according to the chemically foaming agent advances (the composition is vulcanized and foamed) so that a foam can be obtained. The foam is processed into a desired shape, so that a foam for sportswear is obtained.

For the vulcanization and shaping, any method is usable, examples thereof including compressing forming using a mold, and heating using a steam can, an air bath, infrared rays, or microwaves. About conditions for the vulcanization, the heating temperature is from 100 to 200° C., and the heating period, which is varied in accordance with the temperature, is usually from 0.5 to 300 minutes.

The foam state of the resultant foam for sportswear is not particularly limited, and preferably has an independent air-bubble structure for use as a wetsuit from the viewpoint of heat retaining property, impact absorption, cushion property, and floatage-in-water property.

About the resultant foam for sportswear, next, a slicer or some other is used to strip a skin of one surface thereof, or respective skins of two surfaces thereof. The foam for sportswear is cut alone into a desired shape, or any fiber is bonded onto the surface or surfaces of the foam, and then the resultant is cut into a desired shape. In this way, the material of the present invention for sportswear can be prepared. It is preferred that this material is particularly suitable for a wetsuit.

The fiber to be bonded onto the surface or surfaces of the foam is bondable in the form of a cloth (jersey cloth) such as woven cloth, knitting, nonwoven cloth. The material thereof may be nylon or polyester. The jersey cloth may be a stretchable jersey cloth.

For the bonding between the foam for sportswear and the fiber (jersey cloth), an ordinarily used adhesive is usable. The adhesive is not particularly limited, and is preferably a chloroprene adhesive.

In the present invention, the wetsuit denotes, among protecting suits worn for water sports or a professional action in water or on water, any suit having an inner region to which water makes an entry.

Hereinafter, the present invention will be specifically described by way of working examples and comparative examples. However, the present invention is not limited by the description.

EXAMPLES 1 TO 17, AND COMPARATIVE EXAMPLES 1 TO 4, AND 6 TO 9

A kneader and an open roll were used to knead individual materials shown in Table 1, 3, 5, 7 or 9 described below. In this way, an unvulcanized rubber sheet was formed. The resultant unvulcanized rubber sheet was preliminarily shaped into a sheet 10 mm thick and 100 mm square. Next, spacers 9.5 mm thick and 80 mm square were prepared. The sheet was put into between the spacers, and then a pressing machine of 140° C. temperature was used to subject the sheet to primary vulcanization and primary foaming for 15 minutes by a two-stage foaming method. The sheet was taken out from the pressing machine, and put into between spacers 20 mm thick and 200 mm square. A pressing machine of 150° C. temperature was used to subject the sheet to secondary vulcanization and secondary foaming for 15 minutes. The resultant sponge sheet was cut with a slicer to yield a foam for sportswear having a surface to which a skin layer was laid.

The respective foams of Examples 1 to 17 and Comparative Examples 1 to 9 for sportswear were evaluated about items described below. In Comparative Example 5, a wear "TUSA DIVING GEAR" (manufactured by Tabata Co., Ltd.) was used.

Foamed, or not Foamed:

About each of the foams of Examples 1 to 17 and Comparative Examples 1 to 9 for sportswear, the foam state of the foam for sportswear was examined with the naked eye, and evaluated in accordance with a criterion described below. The result is shown in Table 2, 4, 6, 8 or 10.

○: the examined sample was a foamed product.

x: the examined sample was not a foamed product.

State of the Skin Layer:

About each of the foams of Examples 1 to 17 and Comparative Examples 1 to 9 for sportswear, the foam state of the skin layer of the foam for sportswear was examined with the naked eye, and evaluated in accordance with a criterion described below. The result is shown in Table 2, 4, 6, 8 or 10.

○: the layer was flat and smooth.

x: a crack or voids were generated therein.

Touch Sense:

An evaluator touched each of the foams of Examples 1 to 17 and Comparative Examples 1 to 9 for sportswear. The touch sense obtained at this time was evaluated in accordance with a criterion described below. The result is shown in Table 2, 4, or 6.

○: the touch sense was soft.

x: the touch sense was coarse and stiff.

Specific Gravity:

About each of the foams of Examples 1 to 17 and Comparative Examples 5 to 9 for sportswear, the specific gravity thereof was measured in accordance with a method described in JIS K6268. The result is shown in Table 2, 4, 6, 8 or 10.

Hardness:

About each of the foams of Examples 1 to 17 and Comparative Examples 5 to 9 for sportswear, the hardness thereof was measured at room temperature in accordance with a method described in ASTM D2240. The result is shown in Table 2, 4, 6, 8 or 10.

Weather Resistance Test:

About each of the foams of Examples 1 to 17 and Comparative Examples 5 to 9 for sportswear, a xenon weather meter C135A manufactured by ATLAS Co., Ltd. was used to make a xenon arc test in an XA manner in accordance with a method described in JIS K6266. In this way, a change in the color thereof was examined with the naked eye after the foam was irradiated therewith for 100 hours, and evaluated in accordance with a criterion described below. The result is shown in Table 2, 4, 6, 8 or 10.

○: the color was not changed.

x: the color was changed.

Cold Resistance Test:

About each of the foams of Examples 1 to 17 and Comparative Examples 5 to 9 for sportswear, a thermal shock machine (HL-2W) manufactured by Tanaka Scientific Limited was used to measure the hardness thereof after the foam was allowed to stand still at −10° C. for 72 hours in accordance with a method described in ASTM D2240. The hardness was compared with that at room temperature, and a change between the hardness was evaluated in accordance with a criterion described below. The result is shown in Table 2, 4, 6, 8 or 10.

○: the change point was less than +10.

x: the change point was +10 or larger.

Adhesive Property Test:

A jersey cloth of about 0.5 mm thickness, which was a stretchable thin cloth, was bonded through a chloroprene adhesive onto a surface of each of the foams of Examples 1 to 17 and Comparative Examples 5 to 9 for sportswear. The bonding between the foam and the jersey cloth was checked. The adhesive property of the foam was evaluated in accordance with a criterion described below. The result is shown in Table 2, 4, 8 or 10.

○: the jersey cloth was not peeled.

x: the jersey cloth was peeled.

Individual symbols in Tables 1, 3, 5, 7 and 9 represent the following products, respectively:

1: "EPICHLOMER C", manufactured by Daiso Co., Ltd., epichlorohydrin-ethylene oxide copolymer (molar ratio: 49% mole/51% by mole)

2: "EPICHLOMER CG", manufactured by Daiso Co., Ltd., epichlorohydrin-ethylene oxide-allyl glycidyl ether copolymer (molar ratio: 52% mole/41% by mole/7% by mole)

3: "Splender R-300", manufactured by Kao Corporation.

4: "GOLDEN", manufactured by TENMANFACTICE MFG. CO., LTD.

5: "CELTON N", manufactured by SANKYO KASEI Co., Ltd.

6: "CELMIKE S", manufactured by SANKYO KASEI Co., Ltd.

7: "CELMIKE CE", manufactured by SANKYO KASEI Co., Ltd.

8: "CELMIKE A", manufactured by SANKYO KASEI Co., Ltd.

9: "C.I. Pigment Red 209 (quinacridone pigment)", manufactured by TOYO INK CO., LTD.

10: "HYPALON 40", manufactured by Du Pont Kabushiki Kaisha

11: "ZISNET-DB", manufactured by Sankyo Kasei Co., Ltd.

12: "ARQUAD 2HTF", manufactured by Lion Corporation.

13: "TUSA DIVING GEAR", manufactured by Tabata Co., Ltd.

14: "SHOPRENE SND-8", Showa Denko K.K.

15: "MITSUI EPT1045", manufactured by Mitsui Chemicals, Inc.

16: "N260S", manufactured by JSR Corporation.

TABLE 1

| | Example | | | | |
|---|---|---|---|---|---|
| | 1 | 2 | 3 | 4 | 5 |
| ECH/EO copolymerized rubber *1 | 100.0 | | | | |
| ECH/EO/AGE terpolymerized rubber *2 | | 100.0 | 100.0 | 100.0 | 100.0 |
| N-770, carbon black (reinforcing agent/colorant) | 50.0 | | | | |
| N-880, carbon black (reinforcing agent/colorant) | | | 15.0 | 15.0 | 15.0 |
| Hydrated silica (reinforcing agent) | | 30.0 | 10.0 | 10.0 | 10.0 |
| Di(butoxyethoxy)ethyl adipate (plasticizer) | | | 30.0 | 30.0 | 30.0 |
| Sorbitan monostearate (lubricant) *3 | 3.0 | | 3.0 | 3.0 | 3.0 |
| Stearic acid (lubricant) | | 1.0 | | | |
| Zinc oxide | | 5.0 | | 1.0 | |
| Magnesium oxide (acid acceptor) | 3.0 | | 5.0 | 5.0 | 5.0 |
| FACTICE *4 | | | 10.0 | 10.0 | 10.0 |
| Nickel dibutylthiocarbamate (anti-ageing agent) | 1.0 | | | | |
| 2-Mercaptobenzimidazole (anti-ageing agent) | | 0.5 | 0.5 | 0.5 | 0.5 |
| o,o'-Dibenzamide disulfide (vulcanization retardant) | 0.5 | | | | |
| Urea type foaming aid *5 | | | | | 4.0 |
| 4,4'-Oxybis(benzenesulfonyl-hydrazide) (foaming agent) *6 | 8.0 | 10.0 | 8.0 | | |
| Azodicarbonamide (foaming agent) *7 | | | | 8.0 | |
| Dinitrosopentamethylenetetramine (foaming agent) *8 | | | | | 8.0 |
| Di-2-benzdithiazolyl disulfide (vulcanizing accelerator) | | 1.0 | | | |
| Tetramethylthiuram monosulfide (vulcanizing accelerator) | | 0.5 | | | |
| Ethylene thiourea (vulcanizing agent) | 1.2 | | 1.0 | 1.0 | 1.0 |
| Sulfur (vulcanizing agent) | 0.1 | 1.0 | 0.1 | 0.1 | 0.1 |

Unit: parts by weight

TABLE 2

| | Example | | | | |
|---|---|---|---|---|---|
| | 1 | 2 | 3 | 4 | 5 |
| Foamed or not foamed | ○ | ○ | ○ | ○ | ○ |
| State of skin layer | ○ | ○ | ○ | ○ | ○ |
| Color | Black | White | Black | Black | Black |
| Touch sense | ○ | ○ | ○ | ○ | ○ |
| Specific gravity | 0.30 | 0.33 | 0.22 | 0.16 | 0.18 |
| Hardness (ASTM Type OO) | 67 | 61 | 32 | 22 | 24 |
| Weather resistance | ○ | ○ | ○ | ○ | ○ |
| Cold resistance | ○ | ○ | ○ | ○ | ○ |
| Adhesive property | ○ | ○ | ○ | ○ | ○ |

TABLE 3

Unit: parts by weight

| | Example | | | | | | |
|---|---|---|---|---|---|---|---|
| | 6 | 7 | 8 | 9 | 10 | 11 | 12 |
| ECH/EO/AGE terpolymerized rubber *2 | 100.0 | 100.0 | 100.0 | 100.0 | 100.0 | 100.0 | 100.0 |
| Hydrated silica (reinforcing agent) | 10.0 | 10.0 | 10.0 | 10.0 | 10.0 | 10.0 | 10.0 |
| Light calcium carbonate (filler) | 15.0 | 15.0 | 15.0 | 15.0 | 15.0 | 15.0 | 15.0 |
| Titanium oxide (colorant) | 10.0 | 5.0 | 5.0 | 5.0 | 5.0 | 10.0 | 10.0 |
| Ultramarine blue (colorant) | | 7.0 | | | | | |
| Copper phthalocyanine (colorant) | | | 3.0 | 3.0 | 3.0 | | |
| 3,10-Dicyclo-5,12-dihydroxy[2,3-b]acridine-7,14-dione (colorant) *9 | | | | | | 3.0 | |
| N550, carbon black (colorant) | | | | | | | 3.0 |
| Di(butoxyethoxy)ethyl adipate (plasticizer) | 30.0 | 30.0 | 30.0 | 30.0 | 30.0 | 30.0 | 30.0 |
| Sorbitan monostearate (lubricant) *3 | 3.0 | 3.0 | 3.0 | 3.0 | 3.0 | 3.0 | 3.0 |
| Magnesium oxide (acid acceptor) | 5.0 | 5.0 | 5.0 | 5.0 | 5.0 | 5.0 | 5.0 |
| FACTICE *4 | 10.0 | 10.0 | 10.0 | 10.0 | 10.0 | 10.0 | 10.0 |
| 2-Mercaptobenzimidazole (anti-ageing agent) | 0.5 | 0.5 | 0.5 | 0.5 | 0.5 | 0.5 | 0.5 |
| 4,4'-Oxybis(benzenesulfonylhydrazide) (foaming agent) *6 | 8.0 | 8.0 | 3.0 | 5.0 | 8.0 | 8.0 | 8.0 |
| Ethylene thiourea (vulcanizing agent) | 1.0 | 1.0 | 1.0 | 1.0 | 1.0 | 1.0 | 1.0 |
| Sulfur (vulcanizing agent) | 0.1 | 0.1 | 0.1 | 0.1 | 0.1 | 0.1 | 0.1 |

TABLE 4

| | Example | | | | | | |
|---|---|---|---|---|---|---|---|
| | 6 | 7 | 8 | 9 | 10 | 11 | 12 |
| Foamed or not foamed | ○ | ○ | ○ | ○ | ○ | ○ | ○ |
| State of skin layer | ○ | ○ | ○ | ○ | ○ | ○ | ○ |
| Color | White | Light blue | Blue | Blue | Blue | Pink | Gray |
| Touch sense | ○ | ○ | ○ | ○ | ○ | ○ | ○ |
| Specific gravity | 0.17 | 0.25 | 0.44 | 0.31 | 0.20 | 0.21 | 0.21 |
| HS (ASTM Type OO) | 28 | 32 | 47 | 44 | 27 | 30 | 30 |
| Weather resistance | ○ | ○ | ○ | ○ | ○ | ○ | ○ |
| Cold resistance | ○ | ○ | ○ | ○ | ○ | ○ | ○ |
| Adhesive property | ○ | ○ | ○ | ○ | ○ | ○ | ○ |

TABLE 5

Unit: parts by weight

| | Comparative Example | | | | | |
|---|---|---|---|---|---|---|
| | 1 | 2 | 3 | 4 | 5 | 6 |
| ECH/EO/AGE terpolymerized rubber *2 | 100.0 | 100.0 | 100.0 | 100.0 | Chloroprene foam for black wetsuit *13 | |
| Chlorosulfonated polyethylene *10 | | | | | | 100.0 |
| Hydrated silica (reinforcing agent) | 10.0 | 10.0 | 10.0 | 10.0 | | |
| Light calcium carbonate (filler) | 15.0 | 15.0 | 15.0 | 15.0 | | |
| Talc (filler) | | | | | | 60.0 |
| Titanium oxide (colorant) | 10 | 10 | 10 | 10 | | |
| Di(butoxyethoxy)ethyl adipate (plasticizer) | 30.0 | 30.0 | 30.0 | 30.0 | | |
| Dioctyl phthalate (plasticizer) | | | | | | 50.0 |
| Sorbitan monostearate (lubricant) *3 | 1.0 | 1.0 | 1.0 | 1.0 | | |
| Stearic acid (lubricant) | | | | | | 2.0 |
| Magnesium oxide (acid acceptor) | 5.0 | 5.0 | 5.0 | 5.0 | | 5.0 |
| FACTICE *4 | 10.0 | 10.0 | 10.0 | 10.0 | | |
| 2-Mercaptobenzimidazole (anti-ageing agent) | 0.5 | 0.5 | 0.5 | 0.5 | | |
| 4,4'-Oxybis(benzenesulfonylhydrazide) (foaming agent) *6 | 8.0 | 8.0 | | 21.0 | | 20.0 |
| Ethylene thiourea (vulcanizing agent) | | 10.5 | 1.0 | 1.0 | | |
| Sulfur (vulcanizing agent) | | 0.1 | 0.1 | 0.1 | | |
| Dibutylaminotriazinethiol *11 | | | | | | 2.5 |
| Quaternary ammonium salt *12 | | | | | | 2.5 |

TABLE 6

| | Comparative Example | | | | | |
|---|---|---|---|---|---|---|
| | 1 | 2 | 3 | 4 | 5 | 6 |
| Foamed or not foamed | X | ○ | X | X | ○ | ○ |
| State of skin layer | X | X | X | X | ○ | ○ |
| Color | White | White | White | White | Black | White |
| Touch sense | X | X | X | X | ○ | X |
| Specific gravity | — | — | — | — | 0.17 | 0.40 |
| HS (ASTM Type OO) | — | — | — | — | 20 | 50 |
| Weather resistance | — | — | — | — | ○ | ○ |
| Cold resistance | — | — | — | — | X | ○ |
| Adhesive property | — | — | — | — | ○ | ○ |

TABLE 7

| | Example | | | | |
|---|---|---|---|---|---|
| | 13 | 14 | 15 | 16 | 17 |
| ECH/EO/AGE terpolymerized rubber *2 | 100 | 50 | 100 | 50 | 50 |
| CR *14 | | 50 | | | |
| EPDM *15 | | | | 50 | |
| NBR *16 | | | | | 50 |
| Hydrated silica gel (reinforcing agent) | 20 | 20 | 20 | 20 | 20 |
| Titanium oxide (colorant) | 40 | 40 | 40 | 40 | 40 |
| Sorbitan monostearate (lubricant) *3 | 3 | 3 | | | |
| Stearic acid (lubricant) | | | 1 | 1 | 1 |
| Dioctyl phthalate (plasticizer) | 30 | 30 | 30 | 30 | 30 |
| 2-Mercaptobenzimidazole (anti-ageing agent) | 0.5 | 0.5 | 0.5 | 0.5 | 0.5 |

TABLE 7-continued

| | Example | | | | |
|---|---|---|---|---|---|
| | 13 | 14 | 15 | 16 | 17 |
| FACTICE *4 | 10 | 10 | 10 | 10 | 10 |
| Magnesium oxide (acid acceptor) | 5 | 5 | | | |
| Zinc oxide | | | 5 | 5 | 5 |
| Di-2-benzdithiazolyl disulfide (vulcanizing accelerator) | | | 1 | 1 | 1 |
| Tetramethylthiuram monosulfide (vulcanizing accelerator) | | | 0.5 | 0.5 | 0.5 |
| Sulfur (vulcanizing agent) | 0.1 | 0.1 | 1 | 1 | 1 |
| Ethylene thiourea (vulcanizing agent) | 1 | 1 | | | |
| Azodicarbonamide (foaming agent) *7 | 8 | 8 | 8 | 8 | 8 |
| 4,4'-Oxybis(benzenesulfonyl-hydrazide) (foaming agent) *6 | 4 | 4 | 4 | 4 | 4 |

Unit: parts by weight

TABLE 8

| | Example | | | | |
|---|---|---|---|---|---|
| | 13 | 14 | 15 | 16 | 17 |
| Foamed or not foamed | ○ | ○ | ○ | ○ | ○ |
| State of skin layer | ○ | ○ | ○ | ○ | ○ |
| Color | White | White | White | White | White |
| Touch sense | ○ | ○ | ○ | ○ | ○ |
| Specific gravity | 0.201 | 0.223 | 0.252 | 0.273 | 0.256 |
| HS (ASTM Type OO) | 36 | 35 | 43 | 45 | 39 |
| Weather resistance | ○ | ○ | ○ | ○ | ○ |
| Cold resistance | ○ | ○ | ○ | ○ | ○ |
| Adhesive property | ○ | ○ | ○ | ○ | ○ |

TABLE 9

| | Comparative Example | | |
|---|---|---|---|
| | 7 | 8 | 9 |
| CR*14 | 100 | | |
| EPDM *15 | | 100 | |
| NBR *16 | | | 100 |
| Hydrated silica gel (reinforcing agent) | 20 | 20 | 20 |
| Titanium oxide (colorant) | 40 | 40 | 40 |
| Sorbitan monostearate (lubricant) *3 | 3 | | |
| Stearic acid (lubricant) | | 1 | 1 |
| Dioctyl phthalate (plasticizer) | 30 | 30 | 30 |
| 2-Mercaptobenzimidazole (anti-ageing agent) | 0.5 | 0.5 | 0.5 |
| FACTICE *4 | 10 | 10 | 10 |
| Magnesium oxide (acid acceptor) | 5 | | |
| Zinc oxide | | 5 | 5 |
| Di-2-benzdithiazolyl disulfide (vulcanizing accelerator) | | 1 | 1 |
| Tetramethylthiuram monosulfide (vulcanizing accelerator) | | 0.5 | 0.5 |
| Sulfur (vulcanizing agent) | 0.1 | 1 | 1 |
| Ethylene thiourea (vulcanizing agent) | 0.5 | 1 | 1 |
| Azodicarbonamide (foaming agent) *7 | 8 | 8 | 8 |
| 4,4'-Oxybis(benzenesulfonylhydrazide) (foaming agent) *6 | 4 | 4 | 4 |

Unit: parts by weight

TABLE 10

| | Comparative Example | | |
|---|---|---|---|
| | 7 | 8 | 9 |
| Foamed or not foamed | ○ | ○ | ○ |
| State of skin layer | ○ | ○ | ○ |
| Color | White | White | White |
| Touch sense | ○ | x | x |
| Specific gravity | 0.197 | 0.232 | 0.205 |
| HS (ASTM Type OO) | 26 | 35 | 27 |
| Weather resistance | x | ○ | x |
| Cold resistance | x | ○ | ○ |
| Adhesive property | ○ | x | ○ |

From the results in Table 6, it is understood that in each of Comparative Examples 1 to 4, wherein the vulcanizing agent and the foaming agent were out of the scope of the present invention, the foaming was not satisfactorily attained, or the state of the skin layer was bad even when the foaming was attained. This result is based on the following: In any case where a composition contains no vulcanizing agent, the composition is not vulcanized so that a decomposition gas cannot be kept. Thus, no foam can be formed. In any case where a composition contains an excessive amount of a vulcanizing agent, the rubber elasticity of the resultant foam is lost so that the foam is in a resin state to be brittle. Thus, its skin layer and its sponge layer are cracked. In any case where a composition contains no foaming agent, no decomposition gas is generated so that no foam can be formed. In any case where a composition contains an excessive amount of a foaming agent, the composition undergoes vulcanization inhibition. Thus, a gas releases therefrom so that no foam can be formed.

According to the results in Tables 6 and 10, the chloroprene rubber foam of Comparative Example 5 was largely increased in hardness at the low temperature to be unfavorable from the viewpoint of cold resistance. The chlorosulfonated polyethylene foam of Comparative Example 6 had a coarse and stiff touch sense to be unfavorable from the viewpoint of touch sense. The chloroprene rubber foam of Comparative Example 7 was largely increased in hardness at the low temperature to be unfavorable from the viewpoint of cold resistance. Furthermore, in the weather resistance test, it was verified that the foam was discolored. Thus, the foam was unfavorable from the viewpoint of weather resistance. The ethylene propylene diene rubber foam of Comparative Example 8 had a coarse and stiff touch sense to be unfavorable from the viewpoint of touch sense. Furthermore, the foam was also unfavorable from the viewpoint of adhesive property to the jersey cloth. The acrylonitrile butadiene rubber of Comparative Example 9 had a coarse and stiff touch sense to be unfavorable from the viewpoint of touch sense. Furthermore, in the weather resistance test, it was verified that the foam was discolored. Thus, the foam was unfavorable from the viewpoint of weather resistance.

From the results in Tables 2, 4 and 8, it is understood that the black foams of Examples 1, and 3 to 5 of the present invention for sportswear, and the bright color foams of Examples 2, and 6 to 17 of the present invention for sportswear favorably had a soft touch sense, were excellent in cold resistance since a large difference was not generated between the hardness at room temperature and that at low temperature, were excellent in weather resistance without being discolored in the weather resistance test, and were excellent in adhesive property onto the jersey cloth.

INDUSTRIAL APPLICABILITY

The composition of the present invention for sportswear, and the foam thereof for a wetsuit that is a foam for sportswear, obtained by vulcanizing and foaming this composition for sportswear can be colored into a vivid color, and further have an excellent weather resistance and cold resistance. Thus, the composition and foam are usable for white and bright color wetsuits. Furthermore, a wear obtained from this composition or foam does not lose comfortableness when put on at low temperature by a person.

The invention claimed is:

1. A composition for sportswear, comprising a rubber component (a) which comprises an epihalohydrin rubber, a vulcanizing agent (b) in an amount of 0.1 to 5 parts by weight for 100 parts by weight of the rubber component (a), and a foaming agent (c) in an amount of 3 to 15 parts by weight therefor, and wherein the epihalohydrin rubber is selected from epichlorohydrin/ethylene oxide copolymer, epichlorohydrin/ethylene oxide/allyl glycidyl ether terpolymer and combinations thereof.

2. The composition for sportswear according to claim 1, further comprising a colorant (d).

3. The composition for sportswear according to claim 1, wherein the epihalohydrin rubber is epichlorohydrin/ethylene oxide copolymer.

4. The composition for sportswear according to claim 1, wherein the vulcanizing agent (b) is selected from polyamines, thioureas, thiadiazoles, mercaptotriazines, quinoxalines, organic peroxides, sulfur, morpholine polysulfides, thiuram polysulfides, polyphenols and combinations thereof.

5. The composition for sportswear according to claim 1, wherein the vulcanizing agent (b) is selected from bisphenol S, 6-methylquinoxaline-2,3-dithiocarbonate, trimercapto-S-triazine, ethylenethiourea, dibutylthiourea, 1,3-diethylthiourea, trimethylthiourea and combinations thereof.

6. The composition for sportswear according to claim 1, wherein the foaming agent (c) is a chemical foaming agent.

7. The composition for sportswear according to claim 1, wherein the foaming agent (c) is selected from azodicarbonamide, azobisisobutyronitrile, barium azodicarboxylate, diazoaminobenzene, dinitrosopentamethylenetetramine, N,N'-dimethyl-N,N'-dinitrosotelephthalamide, trinitrosotrimethylenetriamine, 4,4'-oxybis(benzenesulfonylhydrazide), para-toluenesulfonylhydrazide, p-toluenesulfonylsemicarbazide, sodium hydrogencarbonate and combinations thereof.

8. The composition for sportswear according to claim 1, wherein the foaming agent (c) is selected from azodicarbonamide, dinitrosopentamethylenetetramine, 4,4'-oxybis(benzenesulfonylhydrazide) and combinations thereof.

9. The composition for sportswear according to claim 1, wherein the foaming agent (c) is 4,4'-oxybis(benzenesulfonylhydrazide).

10. The composition for sportswear according to claim 2, wherein the colorant (d) is selected from the group consisting of pigments selected from metals, carbon species, oxides, carbonates, silicates, aluminates, ferrocyanides, azo pigments, polycyclic pigments, dyeing lakes, azine pigments, fluorescent pigments and combinations thereof; and dyes selected from basic dyes, acid dyes, oil-soluble dyes, dispersed dyes and combinations thereof.

11. The composition for sportswear according to claim 2, wherein the colorant (d) is selected from aluminum powder, bronze powder, titanium yellow, carbon black, graphite, titanium oxide, zinc flower, red iron oxide, calcium carbonate, basic magnesium carbonate, clay, ultramarine blue, cobalt blue, iron blue, toluidine red, Permanent Carmine FB, Disazo Yellow AAA, Lake Red C, copper phthalocyanine, indanthrone blue, quinacridone red, Victoria Pure Blue BO Lake, alkali blue toner and combinations thereof.

12. The composition for sportswear according to claim 2, wherein the colorant (d) is a non-black colorant.

13. The composition for sportswear according to claim 1, wherein the rubber component comprising, an epihalohydrin rubber in a proportion of 10% by weight or more.

14. The composition for sportswear according to claim 1, wherein the epihalohydrin rubber is present in a proportion of 10 to 99% by weight, and a rubber other than the epihalohydrin rubber is present in a proportion of 1 to 90% by weight.

15. The composition for sportswear according to claim 14, wherein the rubber component further comprising natural rubber, isoprene rubber, 1,2-polybutadiene, styrene butadiene rubber, butyl rubber, ethylene propylene rubber, ethylene propylene diene rubber, chloroprene rubber, chlorosulfonated polyethylene, chlorinated polyethylene, acrylic rubber, acrylonitrile butadiene rubber, hydrogenated acrylonitrile butadiene rubber and combinations thereof.

16. A foam for sportswear obtained by vulcanizing and foaming the composition for sportswear recited in claim 1.

17. The foam for sportswear according to claim 16, wherein the foam has a closed-cell foam structure.

18. A material for sportswear consisting only of the foam for sportswear recited in claim 16.

19. A material for sportswear comprising a foam material obtained by vulcanizing and foaming a composition comprising a rubber component (a) which comprises an epihalohydrin rubber, a vulcanizing agent (b) in an amount of 0.1 to 5 parts by weight for 100 parts by weight of the rubber component (a), and a foaming agent (c) in an amount of 3 to 15 parts by weight therefor, and wherein the epihalohydrin rubber is selected from epichlorohydrin/ethylene oxide copolymer, epichlorohydrin/ethylene oxide/ally' glycidyl ether terpolymer and combinations thereof, and one or more fibers bonded to a single surface or two surfaces of the foam material.

20. A wetsuit, comprising the material for sportswear recited in claim 18.

* * * * *